United States Patent
Webb et al.

(10) Patent No.: US 9,168,990 B2
(45) Date of Patent: *Oct. 27, 2015

(54) VARIABLE BUOYANCY PROFILING FLOAT

(71) Applicant: Teledyne Instruments, Inc., Thousand Oaks, CA (US)

(72) Inventors: Douglas C. Webb, Falmouth, MA (US); Mark Belcher, East Falmouth, MA (US); Lawrence Bovie, Woods Hole, MA (US); Robert Correllus, Attleboro, MA (US); Andrew Elskamp, Cataumet, MA (US); Hugh E. Fargher, Forestdale, MA (US); Thomas Patterson, Bourne, MA (US); Ernest Petzrick, Mashpee, MA (US); David Pingal, East Falmouth, MA (US); Daniel Ryan, Carver, MA (US); Andrew Sealey, Plymouth, MA (US); Clyde Streeter, West Barnstable, MA (US); James Truman, East Falmouth, MA (US); William Wallace, Duxbury, MA (US); Steven Arruda, Westport, MA (US); Robert G. Melvin, II, Sandwich, MA (US); Thomas W. Altshuler, North Falmouth, MA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,101

(22) Filed: Oct. 1, 2014

(65) Prior Publication Data

US 2015/0128842 A1    May 14, 2015

Related U.S. Application Data

(63) Continuation of application No. 14/079,352, filed on Nov. 13, 2013, now Pat. No. 8,875,645.

(51) Int. Cl.
*B63G 8/24* (2006.01)
*G01C 13/00* (2006.01)
*B63B 22/18* (2006.01)
*B63G 8/00* (2006.01)

(52) U.S. Cl.
CPC . *B63G 8/24* (2013.01); *B63B 22/18* (2013.01); *B63G 8/001* (2013.01); *G01C 13/00* (2013.01); *B63B 2211/02* (2013.01); *B63G 2008/004* (2013.01)

(58) Field of Classification Search
CPC ............................ B63B 3/13; B63B 2022/006
See application file for complete search history.

(56) References Cited

U.S. PATENT DOCUMENTS

| 7,699,677 B2 * | 4/2010 | Yoshida et al. | 441/29 |
| 2006/0201243 A1 * | 9/2006 | Auffret et al. | 73/170.29 |

* cited by examiner

Primary Examiner — Edwin Swinehart
(74) Attorney, Agent, or Firm — K&L Gates LLP (57) ABSTRACT

In various embodiments a variable buoyancy profiling float is disclosed. The variable buoyancy profiling float may comprise a spherical glass housing comprising a first hemisphere and a second hemisphere. The first and second hemispheres may be coupled by a partial vacuum within the spherical glass housing. A buoyancy system may be located at least partially within the spherical glass housing. The buoyancy system may be configured to provide variable buoyancy control to the variable buoyancy profiling float. A sensor bundle may be mounted to the spherical glass housing and may be configured to measure at least one environmental parameter.

20 Claims, 8 Drawing Sheets

VARIABLE BUOYANCY PROFILING FLOAT

CROSS REFERENCE TO RELATED APPLICATIONS

This application is a continuation of U.S. patent application Ser. No. 14/079,352, entitled VARIABLE BUOYANCY PROFILING FLOAT, filed Nov. 13, 2013, the entire disclosure of which is herein incorporated by reference in its entirety.

BACKGROUND

Deep sea monitoring and profiling has become an important part of oceanographic and climatological studies. Conventional autonomous profiling systems are structurally limited to depths of 2,000 meters. For deep sea monitoring of depths beyond 2,000 meters, conventional autonomous systems are insufficient. Some cable-linked or ship-linked monitoring systems may be capable of performing measurements of depths up to 6,000 meters. These systems, however, require a ship or sea-top platform to maintain a link, such as, for example, a cable, with the profiling device during deployment. These systems are insufficient for long-term autonomous profiling and monitoring.

SUMMARY

In various embodiments a variable buoyancy profiling float is provided. In one embodiment, the variable buoyancy profiling float may comprise a spherical glass housing comprising a first hemisphere and a second hemisphere. The first and second hemispheres may be coupled by a partial vacuum within the spherical glass housing. A buoyancy system may be located at least partially within the spherical glass housing. The buoyancy system may be configured to provide variable buoyancy control to the variable buoyancy profiling float. A sensor bundle may be mounted to the spherical glass housing and may be configured to measure at least one environmental parameter.

In various embodiments, a method of autonomous deep-sea profiling is disclosed. In one embodiment, the method may comprise: deploying a variable buoyancy float. The variable buoyancy float may comprise a spherical glass housing comprising a first hemisphere and a second hemisphere, wherein the first and second hemispheres are coupled by a partial vacuum within the spherical glass housing, and wherein the spherical glass housing is configured to withstand pressure up to at least 10,000 psig, a buoyancy system configured to provide autonomous buoyancy control to the variable buoyancy float; and a sensor configured to measure at least one environmental parameter. The method of autonomous deep-sea profiling may further comprise decreasing, by the buoyancy system, buoyancy of the variable buoyancy float to cause the variable buoyancy float to descend to a first depth and measuring, by the sensor, the at least one environmental parameter at the first depth.

In various embodiments a method of generating a variable buoyancy profiling float is disclosed. In one embodiment, the method may comprise: testing a spherical glass housing comprising a first hemisphere and a second hemisphere. The first and second hemispheres may be coupled by a partial vacuum within the spherical glass housing. The spherical glass housing may be configured to withstand at least 10,000 psig. The testing comprises placing the spherical glass housing under operable pressure conditions. The method may further comprise creating one or more access ports into the spherical glass housing, wherein the pattern of the one or more access ports is configured to maintain structural integrity of the spherical glass housing; arranging one or more feed-through connections through the one or more access ports; and testing the spherical glass housing including the one or more feed-through connections under operable pressure conditions.

FIGURES

The features of the various embodiments are set forth with particularity in the appended claims. The various embodiments, however, both as to organization and methods of operation, together with advantages thereof, may best be understood by reference to the following description, taken in conjunction with the accompanying drawings as follows:

DESCRIPTION

Reference will now be made in detail to several embodiments, including embodiments showing example implementations of a variable buoyancy profiling float. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1:
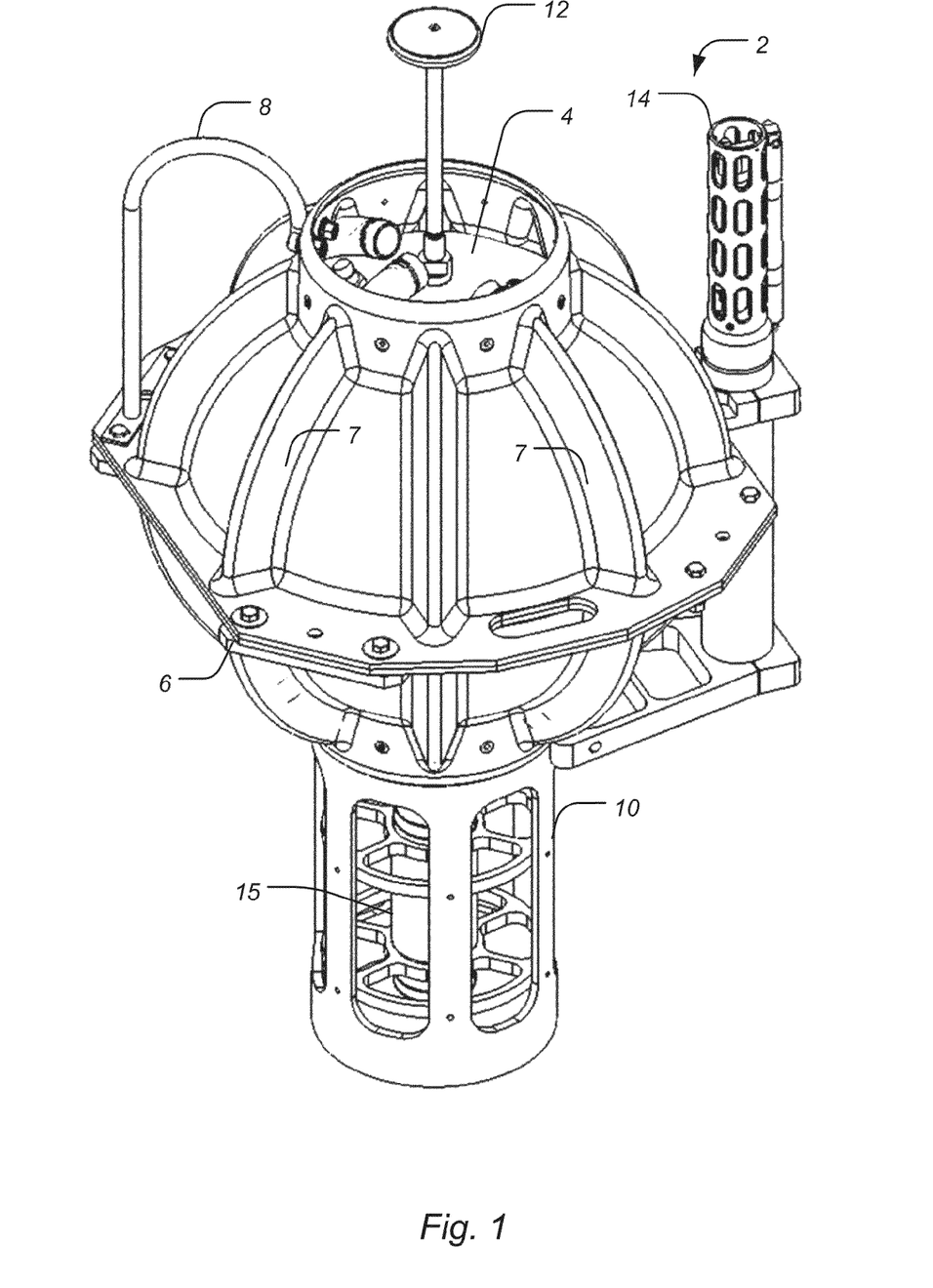
FIG. 1 illustrates one embodiment of a variable buoyancy profiling float.

FIG. 1 illustrates one embodiment of a variable buoyancy profiling float 2. The variable buoyancy profiling float 2 provides monitoring, profiling, and/or measuring of environmental parameters in an aquatic environment at depths up to 6,000 meters. The variable buoyancy profiling float 2 comprises a spherical glass housing 4. The spherical glass housing 4 provides a high buoyancy, light weight housing. The spherical glass housing 4 comprises a housing for one or more systems, such as, for example, sensor systems, hydraulic systems, pneumatic systems, control systems, and/or other internal systems. The spherical glass housing 4 comprises one or more sections, such as, for example, a first hemisphere and a second hemisphere. In some embodiments, the first hemisphere and the second hemisphere of the spherical glass housing 4 may be coupled by a partial vacuum formed within the spherical glass housing 4. The size of the spherical glass housing 4 is determined by, for example, the size of the internal components, the maximum deployment depth required, and/or other operational factors. In one embodiment, the spherical glass housing 4 may comprise, for example, a seventeen inch diameter and a volume of 42,213 cc. The spherical glass housing 4 provides a naturally buoyant housing and a structurally stable housing due to the relative high strength of the sphere.

In some embodiments, a protective hard-hat 6 is disposed about the spherical glass housing 4 to protect the spherical glass housing 4 from environmental hazards before, during, and after deployment. For example, the protective hard-hat 6 may prevent damage to the spherical glass housing 4 due to incidental contact during storage, transportation, and/or deployment. A lifting bail 8 may be coupled to the protective hard-hat 6 to enable easy deployment and/or recovery of the variable buoyancy profiling float 2. The protective hard-hat 6 may comprise one or more ribs 7. The one or more ribs 7 may provide space for bladders configured to receive fluids, such as, for example, oil and/or air. In some embodiments, the variable buoyancy profiling float 2 may comprise a weighted section and/or extension designed to maintain the variable buoyancy profiling float 2 in a specific orientation. For example a lower extension 10 may be coupled to the protective hard-hat 6. The lower extension 10 may comprise a weighted cage and/or weighted components configured to maintain the variable buoyancy profiling float 2 in a specific orientation in which the lower extension 10 is the bottom-most section of the variable buoyancy profiling float 2.

Figure 2:
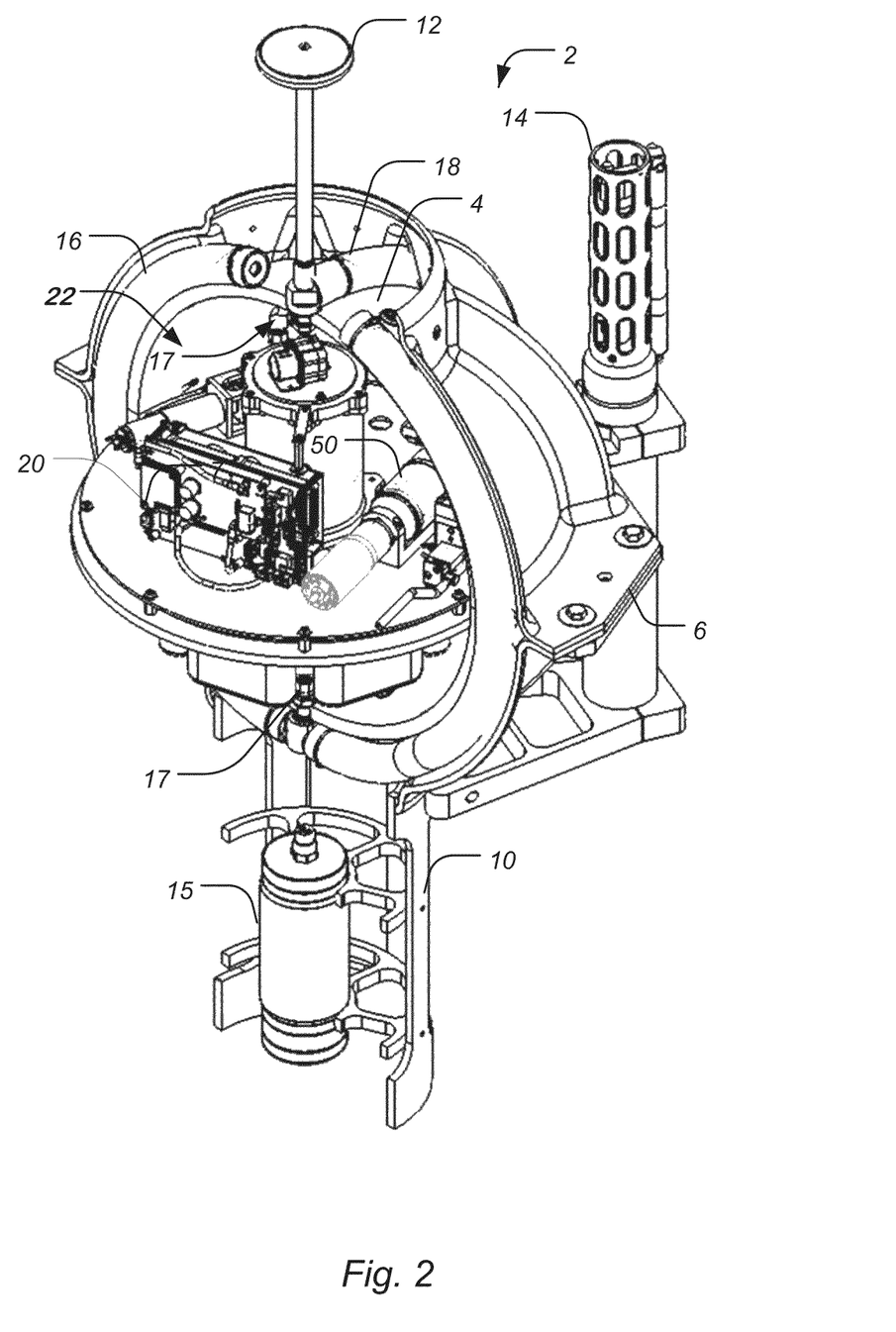
FIG. 2 illustrates a cross-sectional view of the variable buoyancy profiling float of FIG. 1.

FIG. 2 illustrates a cross-sectional view of the variable buoyancy profiling float 2 of FIG. 1. The variable buoyancy profiling float 2 comprises a buoyancy engine. The buoyancy engine comprises one or more bladders 16, 18 coupled to the outer-surface of the spherical glass housing 4. The one or more bladders 16, 18 are coupled to one or more internal components of the buoyancy engine through feed-through connections formed in the spherical glass housing 4. The buoyancy engine may comprise one or more systems configured to increase and/or decrease the buoyancy of the variable buoyancy profiling float 2. The buoyancy engine may comprise, for example, a hydraulic system 22 and/or a pneumatic system. The hydraulic system 22 and/or the pneumatic system may be located within the spherical glass housing 4. The hydraulic system 22 is coupled to one or more oil bladders 16. The pneumatic system is coupled to one or more air bladders 18. The buoyancy engine is operable to vary the buoyancy of the variable buoyancy profiling float 2. By varying the buoyancy of the buoyancy engine, the variable buoyancy profiling float 2 may ascend and/or descend within an aquatic environment. For example, a variable buoyancy profiling float 2 may be deployed on the surface of an aquatic environment, such as, for example, the ocean. The buoyancy engine is activated to decrease the buoyancy of the profiling float 2. The decreased buoyancy causes the variable buoyancy profiling float 2 to descend into the aquatic environment.

Figure 3:
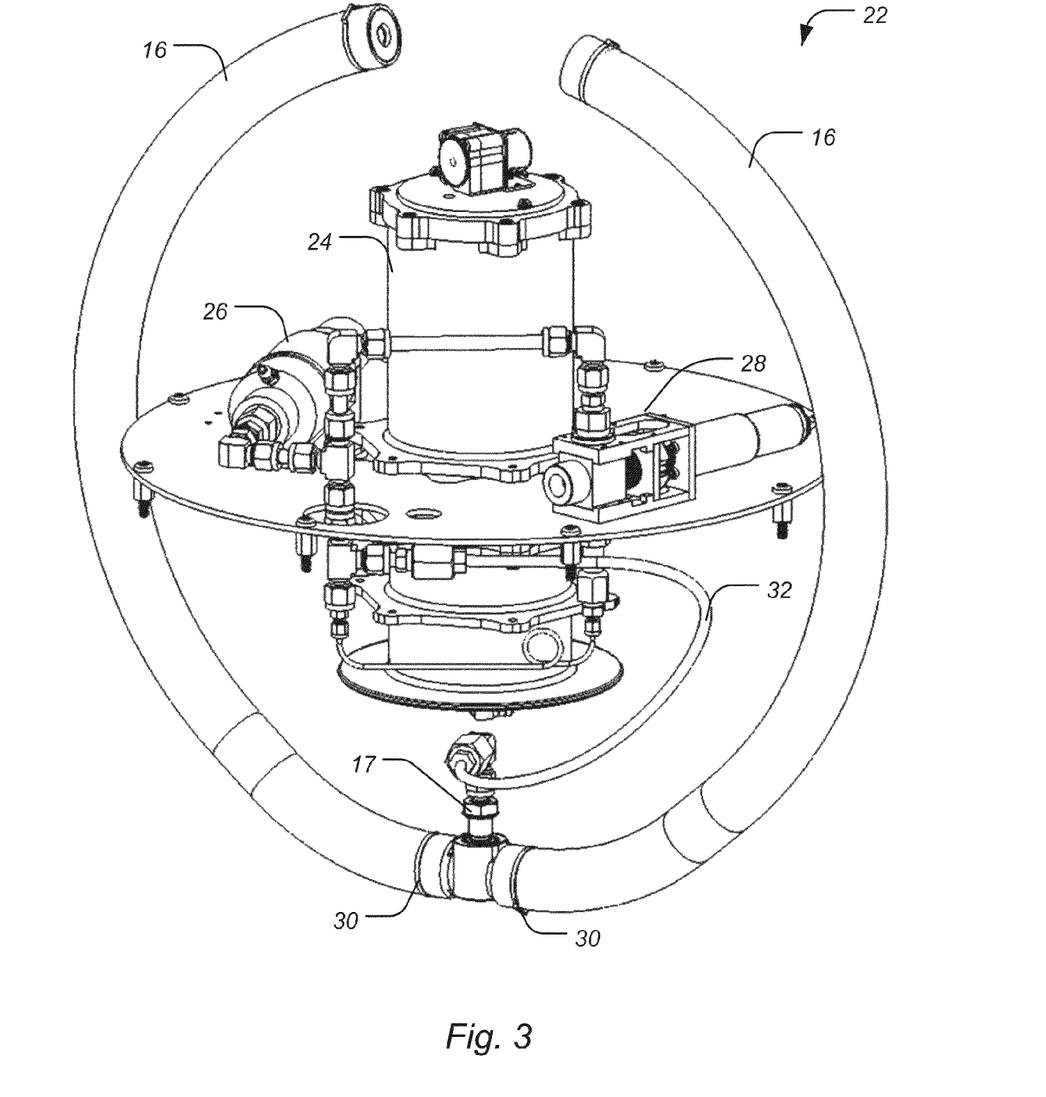
FIG. 3 illustrates one embodiment of a hydraulic system configured to control the buoyancy of the variable buoyancy profiling float of FIG. 1.

In some embodiments, the buoyancy engine comprises a hydraulic system 22 (see FIG. 3). The hydraulic system 22 is configured to alter the buoyancy of the variable buoyancy profiling float 2 by transferring oil to and from one or more oil bladders 16. The oil bladders 16 are located on the outer surface of the spherical glass housing 4. The oil bladders 16 may be covered by one or more ribs 7 of the protective hard-hat 6. An oil reservoir 24 stores oil for the hydraulic system 22. A pump 26 is configured to pump oil from the oil reservoir 24 into the oil bladders 16. When oil is pumped into the oil bladders 16 by the hydraulic system 22, the buoyancy of the variable buoyancy profiling float 2 increases. When oil is enabled to flow out of the oil bladders 16 back into the oil reservoir 24, the buoyancy of the variable buoyancy profiling float 2 decreases.

Figure 8:
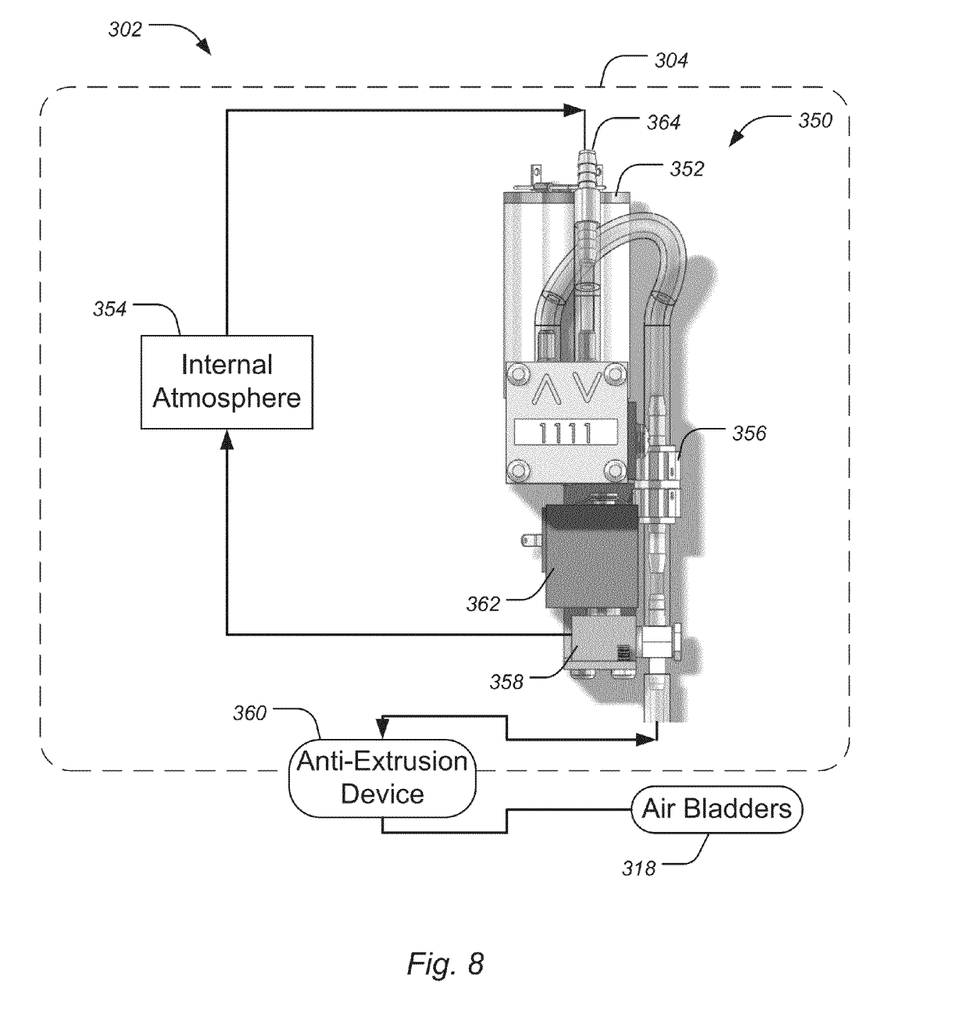
FIG. 8 illustrates one embodiment of a variable buoyancy profiling float comprising a pneumatic buoyancy engine.

In some embodiments, the buoyancy engine comprises a pneumatic system (see FIG. 8). The pneumatic system is configured to increase and/or decrease the buoyancy of the variable buoyancy profiling float 2 by transferring air to and from one or more air bladders 18. The air bladders 18 are located on the outer surface of the spherical glass housing 4. The air bladders 18 may be covered by one or more ribs 7 of the protective hard-hat 6. A pneumatic pump 50 is configured to pump air from within the spherical glass housing 4 into the one or more air bladders 18. In some embodiments, the partial vacuum within the spherical glass housing 4 comprises an air supply for the pneumatic system while maintaining a sufficient vacuum to seal the first hemisphere and the second hemisphere of the spherical glass housing 4. In some embodiments, an air reservoir may be contained within the spherical glass housing 4 to supply the pneumatic system with air. The pneumatic system may be configured to provide, for example, additional buoyancy to the variable buoyancy profiling float 2 during deployment, recovery, and/or operation of the radio system.

The oil bladders 16 of the hydraulic system 22 and/or the air bladders 18 of the pneumatic system are coupled to the internal components of the variable buoyancy profiling float 2 through one or more access ports 17 formed in the spherical glass housing 4. The access ports 17 are arranged in a pattern to maintain the structural integrity of the spherical glass housing 4 when the variable buoyancy profiling float 2 is under pressure. Those skilled in the art will recognize that specific pattern of the access ports 17 may vary depending on the number of access ports 17 formed in the spherical glass housing 4. One or more feed-through connections may be placed at the access ports 17 to seal the spherical glass housing 4, provide structural integrity at the access ports, and to enable internal components and external components to be coupled.

In some embodiments, a controller 20 is located within the spherical glass housing 4. The controller 20 is configured to control one or more systems of the variable buoyancy profiling float 2, such as, for example, the buoyancy engine (for example, the hydraulic system 22 and/or the pneumatic system), a sensor system, and/or a radio system. The controller 20 may comprise a processing unit and a memory unit for storing instructions. In some embodiments, the controller 20 is configured to control the buoyancy engine. The controller 20 may be coupled to one or more sensors, such as, for example, a CTD sensor 14 and/or an altimeter 15. The controller 20 may use the input from the one or more sensors 14, 15 to control the systems of the variable buoyancy profiling float 2.

In some embodiments, the controller 20 is configured to autonomously control the depth of the variable buoyancy profiling float 2. The controller 20 controls the buoyancy engine to alter the buoyancy of the variable buoyancy profiling float 2. For example, the buoyancy engine may comprise a hydraulic system 22 and/or a pneumatic system. The controller 20 controls the hydraulic system 22 and/or the pneumatic system. The controller 20 may be configured to control the transfer of oil between the reservoir 24 and the one or more oil bladders 16. The controller 20 may further be configured to control the pneumatic system to transfer air between an air reserve and the one or more air bladders 18. The transfer of oil and/or air alters the buoyancy of the variable buoyancy profiling float 2, which in turn alters the depth of the variable buoyancy profiling float 2 within the aquatic environment.

An antenna 12 is located external of the spherical glass housing 4 and is coupled to a radio system through a feed-through connection formed in the spherical glass housing 4. The antenna 12 may be coupled to a transmitter and/or a receiver. The antenna 12 is configured to withstand pressures of up to 10,000 psi. The antenna 12 transmits and/or receives signals from terrestrial and/or extraterrestrial sources. In some embodiments, the controller 20 is coupled to the radio system, which is coupled to the antenna 12. The controller 20 may be configured to transmit one or more measurements taken by one or more sensors to a remote location through the antenna 12.

One or more sensors may be configured to collect information regarding the ambient aquatic environment. In some embodiments, a Conductivity/Temperature/Depth (CTD) 14 sensor is located externally to the spherical glass housing 4. The CTD sensor 14 is configured to derive saline measurements from electrical conductivity of the surrounding environment, depth measurements from the hydrostatic pressure applied to the CTD sensor 14, and to take direct temperature readings of the surrounding environment.

In some embodiments, an altimeter 15 is coupled to the variable buoyancy profiling float 2. The altimeter 15 may be coupled to the lower extension 10 of the protective hard-hat 6. The altimeter 15 provides a depth and/or altitude measurement to the controller 20. In some embodiments, the weight of the altimeter 15 maintains the variable buoyancy profiling float 2 in an orientation in which the altimeter 15 is the bottom-most section of the variable buoyancy profiling float 2. Additional and/or different sensors may be incorporated both externally and internally of the spherical glass housing 4. For example, additional sensors may comprise acoustic sensors, light sensors, radiation sensors, and/or any other suitable sensor type.

In some embodiments, the controller 20 utilizes input from the one or more sensors, such as, for example, the CTD sensor 14 and/or the altimeter 15 to autonomously control the variable buoyancy profiling float 2. The controller 20 may control the buoyancy engine to alter the buoyancy of the variable buoyancy profiling float 2 to cause the variable buoyancy profiling float 2 to ascend and/or descend to a specific depth within the aquatic environment and adjust the rate of ascent and/or descent. The controller 20 may utilize the readings from the CTD sensor 14 and/or the altimeter 15 to determine when the variable buoyancy profiling float 2 has reached a specific depth. For example, in one embodiment, the controller 20 may be configured to lower the variable buoyancy profiling float 2 to a first depth, take measurements using one or more sensors, for example, the CTD sensor 14, descend to a second depth, take additional measurements using the CTD sensor 14, and ascend to the surface to transmit the measurements to a remote location. The controller 20 may alter the buoyancy of the variable buoyancy profiling float 2 by operating the buoyancy engine. The controller 20 may monitor one or more sensors, such as, for example, the altimeter 15, to determine when the variable buoyancy profiling float 2 has reached a specific altitude. In some embodiments, the controller 20 may be configured to cause the variable buoyancy profiling float 2 to descend to a specific depth and maintain the specific depth while taking measurements using one or more sensors 14, 15 at specific and/or random intervals, such as, for example, depth or time-based intervals. In some embodiments, the controller 20 is configured to take continuous measurements during ascent and/or descent of the variable buoyancy profiling float 2. The controller 20 may operate the buoyancy engine to vary the depth of the variable buoyancy profiling float 2, for example, by increasing the buoyancy to cause the variable buoyancy profiling float 2 to ascend or decreasing the buoyancy to cause the variable buoyancy profiling float 2 to descend.

In one embodiment, a battery is mounted within the spherical glass housing 4. The battery may be configured to provide energy to the controller 20, one or more transmitters and/or receivers, the buoyancy engine (such as the hydraulic system 22 and/or the pneumatic system), and/or other systems or components. The battery may comprise, for example, a lithium-primary battery, an alkaline battery, and/or any other suitable battery type. In some embodiments, a plurality of batteries may be included within the spherical glass housing 4. The battery may comprise a single use and/or a rechargeable battery. In some embodiments, the battery may be sized to provide sufficient current to the hydraulic system 22 and/or the pneumatic system for repeated dives at depth. The battery may be configured to be removed and/or replaced during refurbishment of a variable buoyancy profiling float 2.

FIG. 3 illustrates one embodiment of a buoyancy engine comprising a hydraulic system 22. The hydraulic system 22 may be configured to vary the buoyancy of the variable buoyancy profiling float 2 to cause the variable buoyancy profiling float 2 to descend and/or ascend to various depths within an aquatic environment. The hydraulic system 22 may comprise one or more oil bladders 16. The oil bladders 16 may be coupled to the outer surface of the spherical glass housing 4. The one or more oil bladders 16 may be fluidically coupled to a reservoir 24, a pump 26, and a valve 28 located within the spherical glass housing 4. The oil bladders 16 may be coupled to one or more internal components of the hydraulic system 22 through a feed-through connection formed in the spherical glass housing 4. A flexible hydraulic line 32 may fluidically couple the oil reservoir 24 and/or the pump 26 to the feed-through connection. The reservoir 24 may be configured to store oil that may be pumped into the one or more oil bladders 16 by the pump 26. In some embodiments, an anti-extrusion device 30 may be located at the feed-through connection.

In operation, the pump 26 may pump oil from the reservoir 24 into the oil bladders 16 to increase the buoyancy of the variable buoyancy profiling float 2. The pump 26 may comprise, for example, a direct current (DC) motor-driven pump to pump oil from the reservoir 24 to the oil bladders 16. The reservoir 24 may be configured to hold at least a volume of oil sufficient to fill the oil bladders 16 to capacity. The size of the oil bladders 16 may be varied based on the desired buoyancy characteristics and size of the variable buoyancy profiling float 2. A valve 28 may be configured to enable oil to flow from the oil bladders 16 into the reservoir 24. In some embodiments, the valve 28 may comprise a three-way valve. The valve 28 may be configured to enable oil to flow from the oil bladders 16 into the reservoir 24, for example, due to external pressure exerted on the one or more oil bladders 16 by an ambient environment. The pump 26 and/or the valve 28 may be controlled by the controller 20. In operation, a portion of the oil in the system is maintained in the oil bladders 16 to prevent differential pressure between the oil bladders 16 and the oil in the hydraulic system 22.

Figure 4:
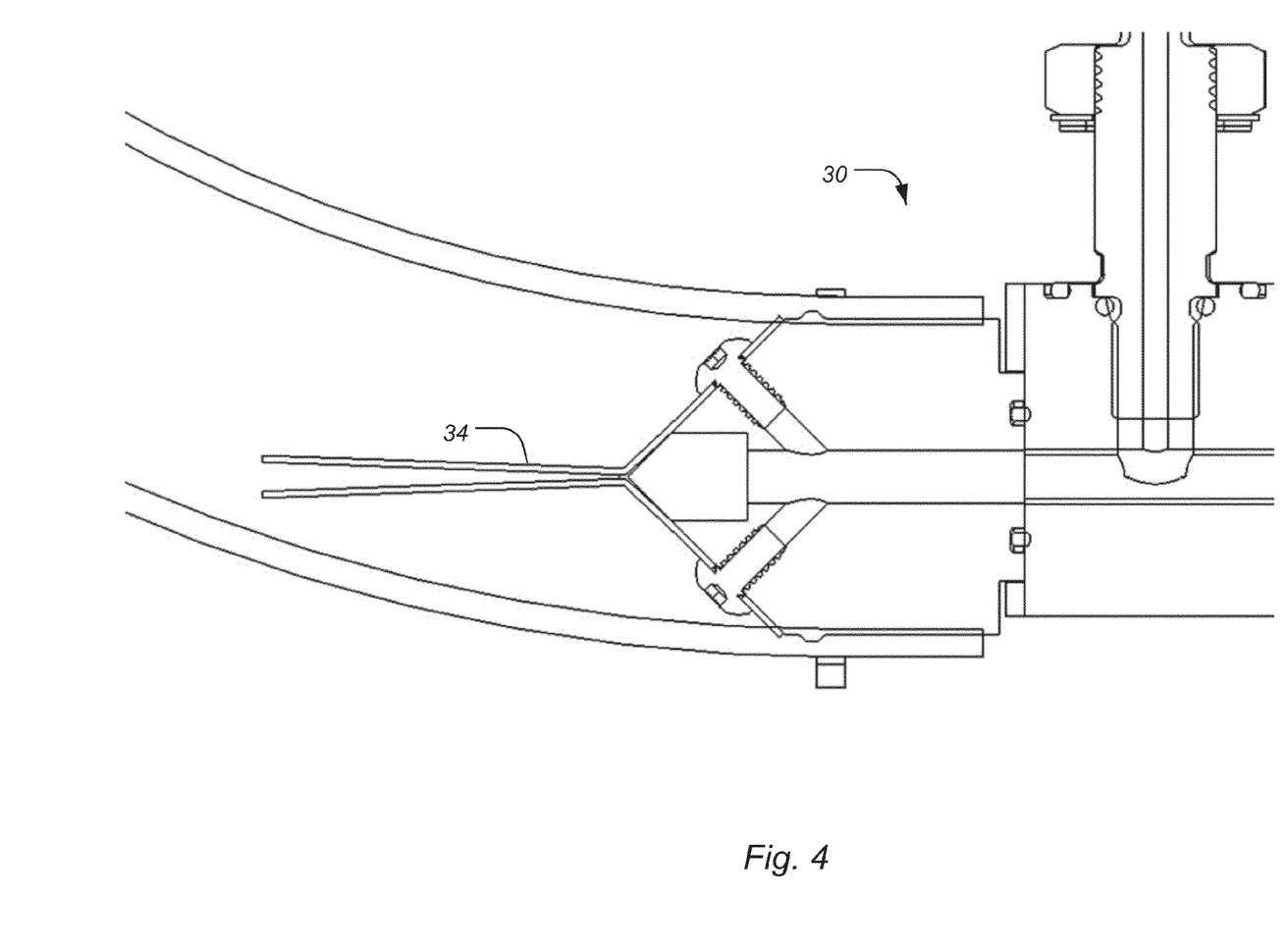
FIG. 4 illustrates one embodiment of an anti-extrusion device.

FIG. 4 illustrates one embodiment of an anti-extrusion device 30. The anti-extrusion device 30 may be coupled between the oil bladder 16 and the flexible hydraulic lines 32 at the feed-through connection in the spherical glass housing 4. The anti-extrusion device 30 comprises a back-up system configured to prevent extrusion of the oil bladders 16 into the spherical glass housing 4 in the event of a pressure loss within the spherical glass housing 4. In one embodiment, the anti-extrusion device 30 may comprise a duckbill valve 34. The duckbill valve 34 may be configured to enable oil to flow between the oil bladders 16 and the reservoir 24 during normal operation. The duckbill valve 34 may prevent extrusion of the oil bladders 16 into the spherical glass housing 4 in the event of a loss of pressure or retraction of all of the oil into the reservoir 24.

Figure 5:
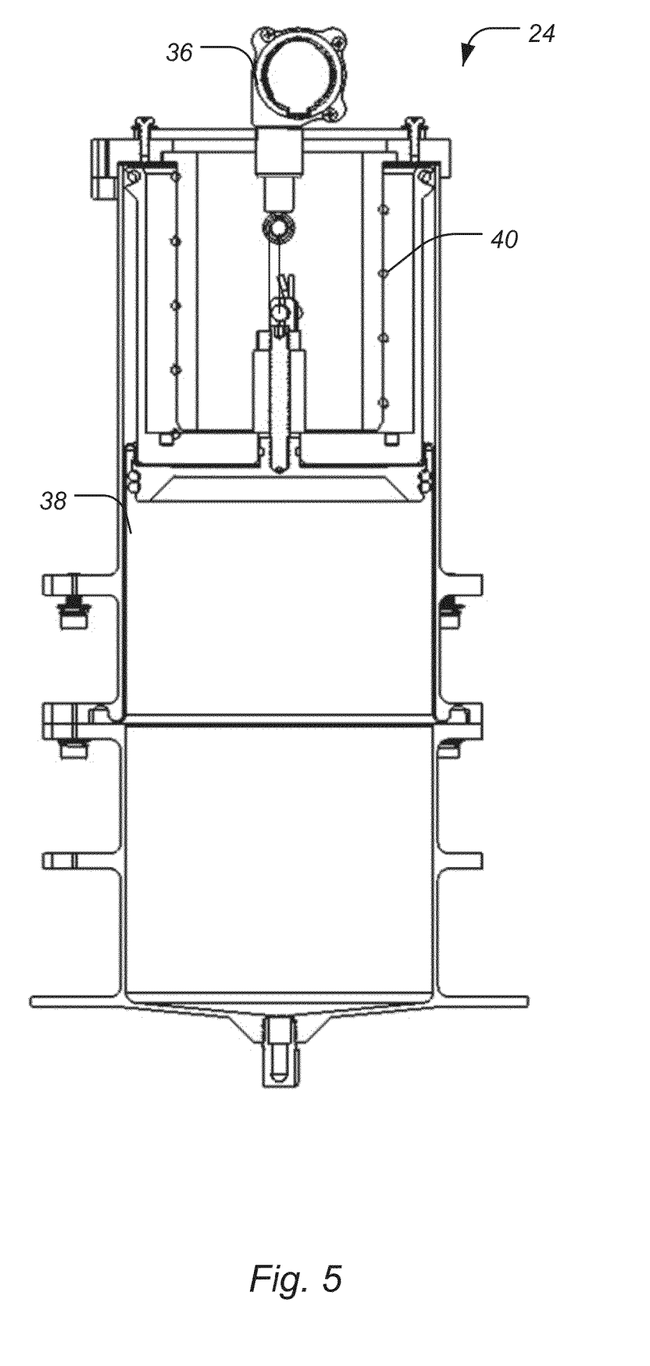
FIG. 5 illustrates one embodiment of a reservoir of the hydraulic system of FIG. 3.

FIG. 5 illustrates one embodiment of an oil reservoir 24. The oil reservoir 24 may be configured to store oil for the hydraulic system 22. The oil reservoir 24 may be coupled to a pump 26 by, for example, one or more flexible hydraulic lines 32. The oil reservoir 24 may comprise an oil capacity sufficient to provide full inflation of the oil bladders 16 when the variable buoyancy profiling float 2 is at a depth of at least 6,000 meters. The pump 26 may comprise a low displacement, high pressure pump configured to provide, for example, up to 10,000 psig of pressure during pumping. In some embodiments, the oil volume is based on volumetric compressibility of the system, including, for example, compressibility from pressure and temperature. The oil reservoir 4 may be configured to provide a mounting platform for one or more additional internal components located within the spherical glass housing 4.

In some embodiments, a rolling diaphragm 38 may be located within the oil reservoir 24. The rolling diaphragm 38 may be configured to enable precise measurement of the oil volume within the oil reservoir 24. The rolling diaphragm 38 may be coupled to a spring 40. The spring 40 may be configured to maintain a force on the rolling diaphragm 38. The rolling diaphragm 38 may maintain a positive pressure on the inlet to the pump 26 from the reservoir 24 due to the force exerted by the spring 40. The positive pressure provided to the pump 26 may be sufficient to ensure fluid flow from the reservoir 24 into the pump 26 when the pump 26 is activated to pump oil into the oil bladders 16. The force exerted by the spring 40 may be less than a force exerted by the ambient pressure of the environment outside of the spherical glass housing 4 such that oil may flow back into the oil reservoir 24 to decrease buoyancy of the variable buoyancy profiling float 2. For example, in one embodiment, atmospheric pressure may be sufficient to overcome the force applied by the spring 40 to the rolling diaphragm 38. A valve 28 may be coupled between the oil reservoir 24 and the oil bladders 16 to provide flow control to and from the oil bladders 16. A potentiometer 36 is coupled to the rolling diaphragm 38 to provide a signal indicative of the volume of oil within the reservoir 24.

Figure 6:
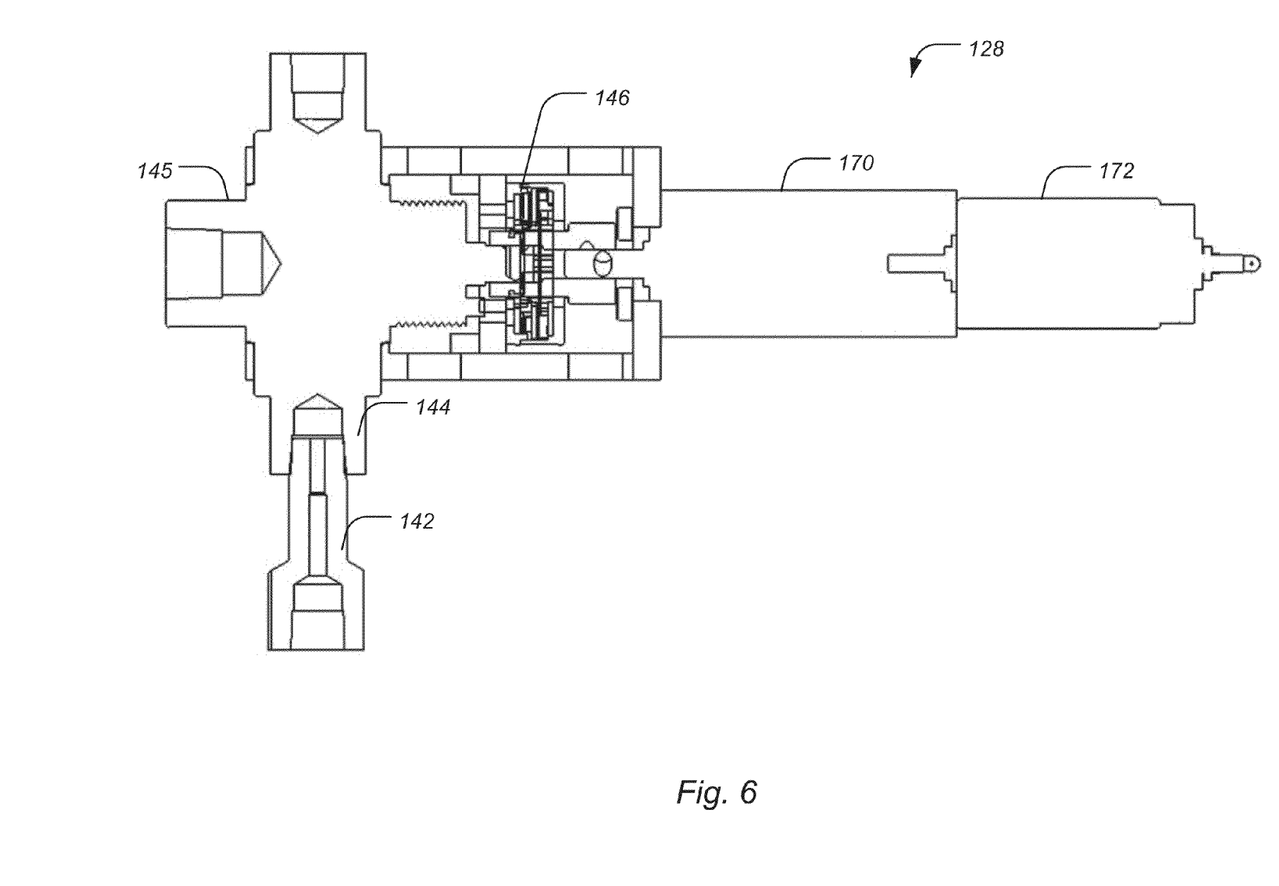
FIG. 6 illustrates one embodiment of a three-way valve of the hydraulic system of FIG. 3.

FIG. 6 illustrates one embodiment of a three-way valve 128. The three-way valve 128 may be coupled between the oil reservoir 24, the oil bladders 16, and the pump 26. The three-way valve 128 may be configured to control oil flow from the oil bladders 16 to the reservoir 24. In some embodiments, the three-way valve 128 may comprise an inlet and two inlets. An inlet may be coupled to the oil bladders 16. One or more outlets 144, 145 may be coupled to the reservoir 24 through a restrictor 142 and/or a straight-through connection. In a first position, the three-way valve 28 prevents oil flow from the oil bladders 16 to the reservoir 24. In a second position, the three-way valve 128 enables oil to flow from the oil bladders 16 into the reservoir 24, through an outlet 145 comprising a straight-through connection to the reservoir 24. In a third position, oil flows through an outlet 144 comprising a restrictor 142 and into the reservoir 24. In one embodiment, the pressure exerted on the oil bladders 16 by the ambient environment may be sufficient to cause oil to flow from the oil bladders 16 into the reservoir 24 when the three-way valve 128 is in the second position. An encoder 146 may provide a signal indicative of the position of the three-way valve 128 to the controller 20.

In some embodiments, a flow restrictor 142 may be coupled to the three-way valve 128. A flow restrictor 142 may be coupled, for example, between the oil bladders 16 and the oil reservoir 24. The flow restrictor 142 may be configured to control the flow rate of oil from the oil bladders 16 to the oil reservoir 24 caused by ambient pressure. The flow restrictor 142 may enable the controller 20 to precisely control the descent rate of the variable buoyancy profiling float 2 to a specific depth. In some embodiments, the three-way valve 128 may comprise a first position in which oil may flow unrestricted from the oil bladders 16 to the reservoir 24. In a second position, a flow restrictor 142 may restrict the flow of oil from the oil bladders 16 to the reservoir 24 to enable the controller 20 to precisely control the descent of the variable buoyancy profiling float 2. The three-way valve 128 comprises a gearbox 170 and a DC-motor 172 configured to alter the position of the three-way valve 128. The encoder 146 provides a signal indicative of the current position of the three-way valve 128.

Figure 7:
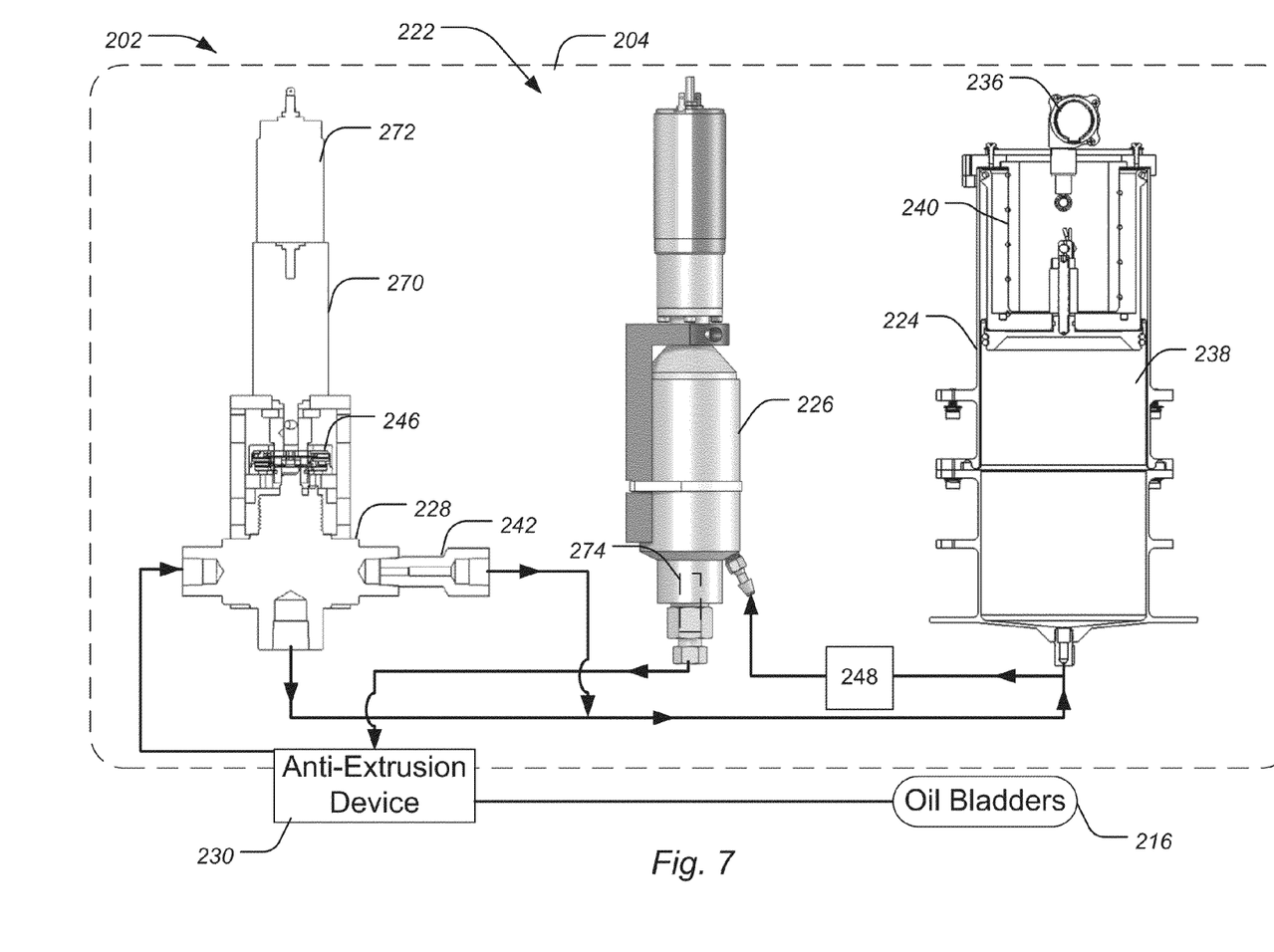
FIG. 7 illustrates one embodiment of a variable buoyancy profiling float comprising a hydraulic buoyancy engine.

FIG. 7 illustrates one embodiment of a variable buoyancy profiling float 202. The variable buoyancy profiling float 202 may comprise a buoyancy engine. The buoyancy engine may comprise a hydraulic system 222. The hydraulic system 222 may be disposed within a spherical glass housing 204. The hydraulic system 222 may be configured to control the buoyancy of a variable buoyancy profiling float 202. The hydraulic system 222 may comprise a reservoir 224 containing a fluid, such as, for example, oil. The reservoir 224 may comprise a rolling diaphragm 238. The rolling diaphragm 238 may be coupled to a spring 240. The spring 240 may exert a force on the rolling diaphragm 238. The rolling diaphragm 238 may maintain a positive pressure at the inlet of the pump 226 due to the force exerted by the spring 240. The positive pressure at the inlet may ensure proper priming of the pump 226. The spring 240 may exert a pressure sufficient to prime the pump 226 but less than atmospheric pressure.

The pump 226 may be coupled to the reservoir 224 and one or more oil bladders 216. The pump 226 may be activated by a controller to pump oil from the oil reservoir 224 to the one or more oil bladders 226. The pump 226 may comprise, for example, a DC motor-driven pump. The pump 226 may be configured to provide an oil flow pressure sufficient to overcome an ambient pressure of an aquatic environment. For example, the pump 226 my be configured to provide at least 10,000 psig if pressure for a variable buoyancy profiling float 202 configured to operate at depths of up to 6,000 meters. In some embodiments, a filter 248 may be disposed between the oil reservoir 224 and the pump 226. A check-valve 274 may be coupled to the outlet of the pump 226.

The oil reservoir 224 may be coupled to the oil bladders 216 through a valve, such as the three-way valve 228. The three-way valve 228 may be configured to control the flow of oil from the oil bladders 216 back into the oil reservoir 224. A flow restrictor 242 may be coupled to the three-way valve 228. The flow restrictor 242 may be configured to provide precise flow-rate control of oil flowing from the oil bladders 216 into the oil reservoir 224. The flow restrictor 242 may comprise, for example, a needle valve. The three-way valve 228 may comprise an encoder 246. The encoder 246 may be configured to provide a signal to a controller to identify the current configuration of the three-way valve 228. The three-way valve 228 may be coupled to one or more oil bladders 216 located on the outer surface of the spherical glass housing 204. An anti-extrusion device 230 may be located at a flow-through connection formed in the spherical glass housing 204. The anti-extrusion device 230 may be configured to prevent extrusion of the oil bladders 216 into the spherical glass housing 204 in the event of pressure loss within the spherical glass housing 204. In some embodiments, the anti-extrusion device 230 may comprise a duckbill valve.

In operation, the reservoir 224 may be configured to provide oil to and receive oil from the external oil bladders 216 to alter the buoyancy of a variable buoyancy profiling float 202.

The pump 226 may be configured to pump oil from the reservoir 224. The buoyancy of the external bladders 216 may increase as oil is pumped into the bladders 216. The three-way valve 228 may be configurable to enable oil to flow from the oil bladders 216 back into the oil reservoir 224. The three-way valve 228 may enable oil to flow from the oil bladders 216 into the oil reservoir 224 to decrease the buoyancy of the variable buoyancy profiling float 202. The three-way valve 228 may comprise a first position in which oil may freely flow from the oil bladders 216 back into the oil reservoir 224. The three-way valve 228 may comprise a second position in which oil is prevented from flowing from the oil bladders 216 into the oil reservoir. The three-way valve 228 may comprise a third position in which oil flow from the oil bladders 216 to the oil reservoir 224 is controlled by the metering valve 242. In some embodiments, the hydraulic system 222 may utilize the ambient pressure on the oil bladders 216 to force oil back into the reservoir 224. For example, in one embodiment, atmospheric pressure may be sufficient to overcome the force exerted by the spring 240 on the rolling diaphragm 238 to cause oil to flow from the oil bladders 216 into the oil reservoir 224. Some oil may be left in the oil bladders 216 after retraction to eliminate differential pressure across the oil bladder 216. In some embodiments, the pump 226 may be configured to pump oil from the oil bladders 216 into the reservoir 224.

FIG. 8 illustrates one embodiment of a variable buoyancy profiling float 302. The variable buoyancy profiling float 302 comprises a spherical glass housing 304. One or more air bladders 318 are coupled to the outer surface of the spherical glass housing 304. The one or more air bladders 318 are coupled to a pneumatic system 350 located within the spherical glass housing. The pneumatic system 350 may comprise a pneumatic pump 352. The pneumatic pump 352 may be configured to pump air into the one or more air bladders 318. In one embodiment, the pneumatic pump 352 may utilize the internal atmosphere 354 within the spherical glass housing 304 as an air source. A partial vacuum may be maintained within the spherical glass housing 304. The partial vacuum may be sufficient to maintain a seal between a first hemisphere and a second hemisphere of the spherical glass housing 304 while still providing sufficient air to inflate the one or more air bladders 318. A check valve 356 may be coupled between the pneumatic pump 352 and the air bladders 318. A release valve 358, such as, for example, a latching solenoid valve 362, may be fluidically coupled to the air bladders 318. The release valve 358 may be configured to enable air to return to the internal atmosphere 354 of the spherical glass housing 304. The partial vacuum maintained within the spherical glass housing 4 may cause air to flow from the air bladders 318 into the spherical glass housing 4 when the return valve 358 is opened. An anti-extrusion device 360 may be located at a feed-through connection in the spherical glass housing 304. The anti-extrusion device 360 may be configured to prevent extrusion of the one or more air bladders 318 into the spherical glass housing 304 due to the external pressure. An air filter 364 may disposed at the intake of the pneumatic pump 350 to provide filtering of the air.

In operation, a variable buoyancy profiling float 2 may be deployed to autonomously monitor one or more environmental parameters. The variable buoyancy profiling float 2 may be configured, for example, to maintain a specific depth and monitor one or more environmental parameters of the ambient aquatic environment. In some embodiments, the controller 20 of the variable buoyancy profiling float 2 may comprise a monitoring algorithm configured to raise and/or lower the depth of the variable buoyancy profiling float over a predetermined period of time to obtain environmental measurements at two or more depths. In some embodiments, the controller may be configured to alter the depth of the variable buoyancy profiling float 2 in response to one or more environmental conditions, such as, for example, the height above a sea-floor.

With reference now to FIGS. 1-8, one embodiment of a method for operating a variable buoyancy profiling float 2 is disclosed. Accordingly, in one embodiment, a variable buoyancy profiling float 2 may be deployed in an aquatic environment, such as, for example, the ocean. The variable buoyancy profiling float 2 may comprise a spherical glass housing 4. The spherical glass housing may comprise a first hemisphere and a second hemisphere. The first and second hemispheres may be coupled by a partial vacuum created within the spherical glass housing 4. The spherical glass housing 4 may be configured for deployment at depths of up 6,000 meters. The spherical glass housing 4 may be configured to withstand pressure up to at least 10,000 psig. The variable buoyancy profiling float 2 may further comprise a buoyancy engine to provide variable buoyancy. In some embodiments, the buoyancy engine may comprise a hydraulic system. The variable buoyancy profiling float 2 may comprise one or more sensors configured to measure at least one environmental parameter.

The variable buoyancy profiling float 2 may be deployed to an aquatic environment, such as, for example, the ocean. A controller 20 may be configured to control operation of the variable buoyancy profiling float 2. The controller 20 may operate the buoyancy engine to decrease the buoyancy of the variable buoyancy profiling float 2, causing the variable buoyancy profiling float 2 to descend to a first depth. The controller 20 may operate one or more sensors to collect environmental parameters at the first depth. In some embodiments, measurements are taken continuously during ascent and/or descent. The controller 20 may store the collected environmental parameters, for example, in a memory module, for later recovery and/or transmission.

After collecting the environmental parameters at the first depth, the controller 20 may activate the buoyancy engine to alter the buoyancy of the variable buoyancy profiling float 2. The controller 20 may increase the buoyancy to ascend and/or decrease the buoyancy to descend. The controller 20 may alter the buoyancy of the variable buoyancy profiling float 2 to cause the variable buoyancy profiling float 2 to reach a second depth. The controller 20 may collect the one or more environmental parameters at the second depth and store the collected data. The controller 20 may follow a preprogrammed routine of descending and/or ascending to a specific depth and measuring one or more environmental parameters.

The controller 20 may be configured to control the variable buoyancy profiling float 2 to ascend and/or descend to any number of depths and collect one or more environmental parameters at each of the depths. The variable buoyancy profiling float 2 may collect the same environmental parameters at each depth or may collect different environmental parameters at different depths. After collecting data at each depth, the controller 20 may increase the buoyancy of the variable buoyancy profiling float 2 using the buoyancy engine to cause the variable buoyancy profiling float 2 to ascend to the surface of the aquatic environment. At the surface, the controller 20 may transmit the collected data comprising the environmental parameters at each depth to a satellite using the antenna 12. In some embodiments, after transmitting the collected data, the controller 20 may activate the buoyancy engine to cause the variable buoyancy profiling float 2 to descend to one or more depths, such as, for example, each of the original depths, and collect environmental data at each depth. In some embodiments, the variable buoyancy profiling float 2 may repeat a cycle of descending to specific depths, collecting environmental data, ascending to the surface, and transmitting data until a predetermined condition is met. For example, the variable buoyancy profiling float 2 may conduct data gathering until the battery reaches a predetermined discharge level or until a specific period of time has passed. In some embodiments, the variable buoyancy profiling float 2 receives communications while on the surface, such as, for example, mission updates. The variable buoyancy profiling float may be recovered once the predetermined condition has been met.

In one embodiment, the buoyancy engine may comprise a secondary buoyancy system, such as, for example, a pneumatic system. The pneumatic system may be configured to provide additional buoyancy to the variable buoyancy profiling float 2, for example, at the surface of the aquatic environment. The pneumatic system may comprise one or more air bladders 18 coupled to the outer surface of the spherical glass housing 4. An air pump may be disposed within the spherical glass housing and may be coupled to the air bladders 18 through one or more feed-through connections. The air pump may be configured to pump air from within the spherical glass housing 4 into the air bladders 18 to increase the buoyancy of the variable buoyancy profiling float 2. The air pump may utilize the partial vacuum within the spherical glass housing 4 as an air source for the pneumatic system. In operation, the secondary pneumatic system may be configured to provide additional buoyancy to the variable buoyancy profiling float 2, for example, when the variable buoyancy profiling float 2 is at or near the surface of the aquatic environment. The additional buoyancy provides improved communications by raising the variable buoyancy float 2 higher above the water.

With reference now to FIGS. 1-8, one embodiment of a method of assembling and testing a variable buoyancy profiling float 2 is disclosed. Accordingly, in one embodiment, a spherical glass housing 4 comprising a first hemisphere and a second hemisphere may be tested for structural strength. The first and second hemispheres may be coupled by a partial vacuum created within the spherical glass housing 4. The spherical glass housing 4 may be placed in a test chamber. A pressure of at least 10,000 psig may be applied to the spherical glass housing 4. If the spherical glass housing 4 sustains the testing pressure without breaking or cracking, the spherical glass housing 4 may be kept for additional production.

The spherical glass housing 4 may have one or more access ports drilled into the spherical glass housing 4 after the pressure testing. The one or more access ports may comprise a pattern configured to maintain the structural integrity of the spherical glass housing and to distribute the load on the spherical glass housing 4. For example, if two access ports are created in the spherical glass housing 4, the access ports may be placed on opposite sides of the spherical glass housing 4. Other patterns and/or arrangements may provide sufficient structural characteristics. One or more feed-through connections may be placed in the access ports. The feed-through connections may be configured to enable external components, such as, for example, one or more oil bladders 16 or air bladders 18, to couple to systems and components within the spherical glass housing. The spherical glass housing 4 with feed-through connections may be placed into the test chamber and may have a pressure of at least 10,000 psig applied. If the spherical glass housing 4 passes, the spherical glass housing 4 may be kept for additional production.

A plurality of systems may be mounted within the spherical glass housing 4. The plurality of systems may comprise, for example, a buoyancy engine, a controller, a sensor system, and/or a radio system. The buoyancy engine may comprise a hydraulic system 22 and/or a pneumatic system. The plurality of systems may be mounted to a plate within the spherical glass housing 4. In some embodiments, one or more components may be mounted directly to the spherical glass housing 4. For example, the oil reservoir of the hydraulic system 22 may be mounted to the spherical glass housing 4. Additional components may be mounted to the oil reservoir and/or other components mounted directly to the spherical glass housing 4. After mounting the plurality of systems, the spherical glass housing 4 may be placed in the pressure testing chamber. A pressure of at least 10,000 psig may be applied to the spherical glass housing 4. While under pressure, the plurality of systems within the spherical glass housing 4 may be tested. For example, the buoyancy engine may be tested by operating the hydraulic system 22 and/or the pneumatic system while the spherical glass housing 4 is under pressure. The controller 20 may be tested by running one or more test algorithms. In some embodiments, the plurality of systems is coupled to an external power source prior to testing. The systems may be tested prior to installation of the batteries. By utilizing an external power source, the internal batteries may be conserved for deployment and use of the variable buoyancy profiling float 2 without draining the batteries during testing. After testing of the spherical glass housing 4 is complete, the protective hard-hat may be coupled over the spherical glass housing 4 and the one or more bladders 16, 18. In some embodiments, a seal test is performed, for example, with helium and/or other gases to test for leaks prior to shipment.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The appended claims are intended to cover all such modification and variations.

All of the above-mentioned U.S. patents, U.S. patent applications publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various aspects of the subject matter described herein are set out in the following numbered clauses:

1. A variable buoyancy profiling float, comprising: a spherical glass housing comprising a first hemisphere and a second hemisphere, wherein the first and second hemispheres are coupled by a partial vacuum within the spherical glass housing; a buoyancy engine located at least partially within the spherical glass housing, the buoyancy engine configured to provide variable buoyancy control to the variable buoyancy profiling float; and a sensor bundle configured to measure at least one environmental parameter.

2. The variable buoyancy profiling float of clause 1, wherein the spherical glass housing is configured to withstand up to 10,000 psig.

3. The variable buoyancy profiling float of clause 1, wherein the buoyancy engine comprises a hydraulic buoyancy system.

4. The variable buoyancy profiling float of clause 3, wherein the hydraulic buoyancy system comprises: an oil reservoir located within the spherical glass housing; at least one oil bladder, wherein the at least one oil bladder comprises a tube coupled to the outer surface of the spherical glass housing, wherein the oil reservoir and the oil bladder are coupled through one or more feed-through connections, wherein the feed-through connections pass through one or more access ports defined by the spherical glass housing; and a pump configured to pump oil from the oil reservoir into the at least one oil bladder.

5. The variable buoyancy profiling float of clause 4, wherein the one or more access ports are arranged to minimize stress concentrations in the spherical glass housing.

6. The variable buoyancy profiling float of clause 4, wherein the hydraulic buoyancy system comprises: a rolling diaphragm located within the oil reservoir, wherein the rolling diaphragm is configured to enable precise measurement of the oil volume within the oil reservoir; and a spring coupled to the rolling diaphragm, the spring configured to maintain a positive pressure to an inlet of the pump.

7. The variable buoyancy profiling float of clause 6, wherein the hydraulic buoyancy system comprises an anti-extrusion mechanism comprising a flapper valve configured to prevent extrusion of the at least one oil bladder into the spherical glass housing if a differential pressure develops between the at least one oil bladder and the oil reservoir.

8. The variable buoyancy profiling float of clause 6, wherein the hydraulic buoyancy system comprises: a valve configured to control oil flow between the oil reservoir and the one or more oil bladders, wherein the valve comprises: a first position configured to enable oil to flow unrestricted from the oil bladder into the reservoir, wherein the oil flow is caused by environmental pressure exerted on the oil bladder; and a second position configured to prevent oil flow to and from the oil bladder.

9. The variable buoyancy profiling float of clause 8, wherein the hydraulic buoyancy system comprises a flow restrictor valve coupled between the valve and the at least one oil bladder, wherein the flow restrictor valve is configured to provide metering control of the oil returned from the at least one oil bladder into the oil reservoir.

10. The variable buoyancy profiling float of clause 4, wherein the hydraulic buoyancy system comprises a flexible hydraulic line, wherein the flexible hydraulic line is configured to enable separation of the first and second hemispheres of the spherical glass housing while maintaining a hydraulic connection between the oil reservoir, the pump, and the one or more feed-through connections.

11. The variable buoyancy profiling float of clause 4, comprising a pneumatic buoyancy system, the pneumatic buoyancy system comprising at least one external reservoir coupled to the outer circumference of the spherical glass housing, wherein the pneumatic buoyancy system utilizes the partial vacuum within the spherical glass housing as an air source.

12. The variable buoyancy profiling float of clause 4, comprising an antenna configured withstand pressure of up to 10,000 psig, and wherein the antenna is configured to communicate with one or more satellites when the variable buoyancy profiling float is on a surface of an aquatic environment.

13. A method of autonomous deep-sea profiling, the method comprising: deploying a variable buoyancy float comprising: a spherical glass housing comprising a first hemisphere and a second hemisphere, wherein the first and second hemispheres are coupled by a partial vacuum within the spherical glass housing, and wherein the spherical glass housing is configured to withstand pressure up to at least 10,000 psi; a buoyancy system configured to provide autonomous buoyancy control to the variable buoyancy float; and a sensor configured to measure at least one environmental parameter; decreasing, by the buoyancy system, buoyancy of the variable buoyancy float to cause the variable buoyancy float to descend to a first depth; and measuring, by the sensor, the at least one environmental parameter at the first depth.

14. The method of autonomous deep-sea profiling of clause 13, comprising: altering, by the buoyancy system, the buoyancy of the variable buoyancy float to move the variable buoyancy float to a second depth; and measuring, by the sensor, the at least one environmental parameter at the second depth.

15. The method of autonomous deep sea profiling of clause 13, comprising opening, by the buoyancy system, a three-position valve to enable oil to flow from an oil bladder into an oil reservoir to alter the buoyancy of the variable buoyancy float.

16. The method of autonomous deep sea profiling of clause 13, comprising increasing, by a pneumatic buoyancy system, the buoyancy of the variable buoyancy float, the pneumatic buoyancy system comprising at least one external reservoir coupled to the outer circumference of the spherical glass housing, wherein the pneumatic buoyancy system utilizes the partial vacuum within the glass sphere housing as an air source.

17. The method of autonomous deep-sea profiling of clause 13, comprising transmitting, by an antenna, the at least one environmental parameter measured by the sensor.

18. A method of generating a variable buoyancy profiling float, the method comprising: testing a spherical glass housing comprising a first hemisphere and a second hemisphere, wherein the first and second hemispheres are coupled by a partial vacuum within the spherical glass housing, and wherein the spherical glass housing is configured to withstand at least 10,000 psig, wherein the testing comprises placing the spherical glass housing under operable pressure conditions; creating one or more access ports into the spherical glass housing, wherein the pattern of the one or more access ports is configured to maintain structural integrity of the spherical glass housing; arranging one or more feed-through connections through the one or more access ports; and testing the spherical glass housing including the one or more feed-through connections under operable pressure conditions.

19. The method of clause 18, comprising: mounting a plurality of functional systems to the spherical glass housing, the plurality of functional systems comprising: a hydraulic buoyancy system, a pneumatic buoyancy system, a sensor, and a transmission system; testing the plurality of functional systems of the variable buoyancy float under operable pressure conditions.

20. The method of clause 19, comprising coupling the plurality of functional systems to an external power source prior to testing the plurality of functional systems under operable pressure conditions.

What is claimed is:

1. A variable buoyancy profiling float, comprising:
a spherical glass housing comprising a first hemisphere and a second hemisphere, wherein the first and second hemispheres are coupled by a partial vacuum within the spherical glass housing;
a buoyancy engine located at least partially within the spherical glass housing, the buoyancy engine configured to provide variable buoyancy control to the variable buoyancy profiling float, and wherein the buoyancy engine comprises a hydraulic buoyancy system and a pneumatic buoyancy system; and
a sensor bundle configured to measure at least one environmental parameter; and
wherein the partial vacuum within the spherical glass housing comprises an air supply for the pneumatic buoyancy system and the partial vacuum is configured to maintain a sufficient vacuum pressure to seal the first hemisphere and the second hemisphere of the spherical glass housing.

2. The variable buoyancy profiling float of claim 1, wherein the spherical glass housing is configured to withstand up to 10,000 psig and is configured to repeat a cycle of descending to a predetermined depth of a body of water, collecting data regarding the at least one environmental parameter via the sensor bundle, ascending to a surface of the body of water, and transmitting the data, wherein the cycle is repeated until a predetermined condition is met.

3. The variable buoyancy profiling float of claim 1, wherein the air supply is contained within an air reservoir located within the spherical glass housing to supply the pneumatic system with air.

4. The variable buoyancy profiling float of claim 3, wherein the spherical glass housing comprises feed-through connections formed therein.

5. A variable buoyancy profiling float, comprising:
a spherical glass housing comprising a first hemisphere and a second hemisphere coupled by a partial vacuum within the spherical glass housing, the spherical glass housing comprising feed-through connections formed therein; and
a hydraulic buoyancy system comprising:
an oil reservoir located within the spherical glass housing;
at least one oil bladder comprising a tube coupled to an outer surface of the spherical glass housing; and
a pump configured to pump oil from the oil reservoir into the at least one oil bladder;
a pneumatic buoyancy system, wherein the partial vacuum within the spherical glass housing comprises an air supply for the pneumatic buoyancy system and the partial vacuum is configured to maintain sufficient vacuum pressure to seal the first hemisphere and the second hemisphere of the spherical glass housing.

6. The variable buoyancy profiling float of claim 5, wherein the oil reservoir and the oil bladder are coupled through the one or more feed-through connections.

7. The variable buoyancy profiling float of claim 5, wherein the hydraulic buoyancy system comprises:
a rolling diaphragm located within the oil reservoir; and
a spring coupled to the rolling diaphragm.

8. The variable buoyancy profiling float of claim 7, wherein the rolling diaphragm is configured to enable precise measurement of the oil volume within the oil reservoir.

9. The variable buoyancy profiling float of claim 7, wherein the spring is configured to maintain a positive pressure to an inlet of the pump.

10. The variable buoyancy profiling float of claim 7, wherein the hydraulic buoyancy system comprises an anti-extrusion mechanism.

11. The variable buoyancy profiling float of claim 10, wherein the anti-extrusion mechanism comprises a flapper valve configured to prevent extrusion of the at least one oil bladder into the spherical glass housing when a differential pressure develops between the at least one oil bladder and the oil reservoir.

12. The variable buoyancy profiling float of claim 7, wherein the hydraulic buoyancy system comprises:
a valve configured to control oil flow between the oil reservoir and the one or more oil bladders, wherein the valve comprises:
a first position configured to enable oil to flow unrestricted from the oil bladder into the reservoir, wherein the oil flow is caused by environmental pressure exerted on the oil bladder;
a second position configured to enable oil to flow restricted from the oil bladder into the reservoir; and
a third position configured to prevent oil flow to and from the oil bladder.

13. The variable buoyancy profiling float of claim 12, wherein the hydraulic buoyancy system comprises a flow restrictor valve coupled between the valve and the at least one oil bladder, wherein the flow restrictor valve is configured to provide metering control of the oil returned from the at least one oil bladder into the oil reservoir.

14. The variable buoyancy profiling float of claim 5, wherein the hydraulic buoyancy system comprises a flexible hydraulic line configured to enable separation of the first and second hemispheres of the spherical glass housing while maintaining a hydraulic connection between the oil reservoir, the pump, and the one or more feed-through connections.

15. The variable buoyancy profiling float of claim 5, wherein the pneumatic buoyancy system comprises at least one external reservoir coupled to the outer circumference of the spherical glass housing.

16. The variable buoyancy profiling float of claim 15, wherein the partial vacuum within the spherical glass housing is utilized by the pneumatic buoyancy system as an air source for the at least one external reservoir.

17. A variable buoyancy profiling float, comprising:
- a spherical glass housing comprising a first hemisphere and a second hemisphere coupled by a partial vacuum within the spherical glass housing comprising feed-through connections formed therein, the spherical glass housing defining one or more access ports; and
- a buoyancy engine located at least partially within the spherical glass housing, the buoyancy engine configured to provide variable buoyancy control to the variable buoyancy profiling float;
- wherein the partial vacuum within the spherical glass housing comprises an air supply for the buoyancy engine and the partial vacuum is configured to maintain sufficient vacuum pressure to seal the first hemisphere and the second hemisphere of the spherical glass housing.

18. The variable buoyancy profiling float of claim 17, wherein the feed-through connections pass through the one or more access ports defined by the spherical glass housing.

19. The variable buoyancy profiling float of claim 17, wherein the one or more access ports comprises a pattern configured to maintain structural integrity of the spherical glass housing and to distribute a load on the spherical glass housing.

20. The variable buoyancy profiling float of claim 19, wherein at least two of the access ports are located on opposite sides of the spherical glass housing.

\* \* \* \* \*